United States Patent [19]

De Angelis

[11] Patent Number: 4,726,546

[45] Date of Patent: Feb. 23, 1988

[54] SEMI-VENTURI AIRFOIL AIRCRAFT

[76] Inventor: Lawrence J. De Angelis, 10116 Kathleen Dr., Oxon Hill, Md. 20745

[21] Appl. No.: 931,139

[22] Filed: Nov. 17, 1986

[51] Int. Cl.[4] .............................................. B64C 39/10
[52] U.S. Cl. .................................... 244/12.6; 244/13; 244/36
[58] Field of Search ....................... 244/13, 12.6, 12.1, 244/34 A, 35 R, 45 R, 45 A, 36, 55

[56] References Cited

U.S. PATENT DOCUMENTS

| 1,693,159 | 11/1928 | Rickelmann | 244/34 A |
|---|---|---|---|
| 2,241,521 | 5/1941 | Richard | 244/45 R |
| 2,476,482 | 7/1949 | Custer | 244/12.6 |
| 2,510,959 | 6/1950 | Custer | 244/12.6 |
| 2,994,493 | 8/1961 | Hartmann | 244/12.6 |
| 3,017,139 | 1/1962 | Binder | 244/12.6 |
| 3,901,463 | 8/1975 | Kovacs | 244/34 A |

Primary Examiner—Galen Barefoot

[57] ABSTRACT

A VTOL/STOL aircraft of simple design and construction. The aircraft has a central semi-venturi shaped airfoil surface defining a channel integral to the fuselage, a canard system and a horizontal stabilizer system at the respective ends of the channel, and a propulsion unit for accelerating airflow through the channel to achieve stable and easily maneuverable flight.

14 Claims, 8 Drawing Figures

SEMI-VENTURI AIRFOIL AIRCRAFT

BACKGROUND OF THE INVENTION

The present invention relates to aircraft or flight vehicles which utilize essentially fixed shaped, non-rotating airfoil surfaces to generate primary lift and which show high stability in flight operations, particularly at low forward speeds such as for short field take-off and landing (STOL) or vertical take-off and landing (VTOL) operations.

There has been considerable interest in flight vehicles of this type and various types of aircraft said to have these characteristics have been proposed. For example, Shew, U.S. Pat. No. 2,957,647 discloses an aircraft of this type which utilizes a pair of upwardly and rearwardly opening channel members located forward of a conventional main wing structure; Hartman, U.S. Pat. No. 2,994,493 discloses a channel fan aircraft in which the powerplant causes air to flow through a ducting channel; Binder, U.S. Pat. No. 3,017,139 discloses a series of ring airfoil aircraft of this type; and Bertelsen, U.S. Pat. No. 3,572,614 discloses an aircraft generally of this type.

The current interest in VTOL and STOL flight vehicles of the type here involved is strongly motivated by advances in remotely piloted vehicle (RPV) technology and optical and electronic surveillance technologies which favor use of platforms of this type.

SUMMARY OF THE INVENTION

Accordingly, an object of the present invention is to provide an improved VTOL/STOL aircraft having a simplified design and structure.

A further object of the invention is to provide a VTOL/STOL flight vehicle having relatively good stability flight operations.

A still further object of the invention is to provide a VTOL/STOL flight vehicle having good maneuverability characteristics and which is relatively simple to control.

A still further object of the invention is to provide a VTOL/STOL aircraft which is adaptable to RPV use as a surveillance platform.

A still further object of the invention is to provide a VTOL/STOL flight vehicle having a relatively simple construction and which is relatively low cost to manufacture.

Toward the fulfillment of these and other objects, the VTOL/STOL aircraft according to the present invention includes a central semi-venturi shaped airfoil surface as its principal lift generating surface, a propulsion system including one or more engine driven propeller or jet propulsion means suitably positioned to accelerate the airflow through the channel of the semi-venturi shaped airfoil to generate lift, and a combination of associated variable air control surfaces and devices to result in a highly stable and maneuverable VTOL/STOL flight vehicle of relatively simple construction.

DESCRIPTION OF THE PREFERRED EMBODIMENTS

Figure 1:
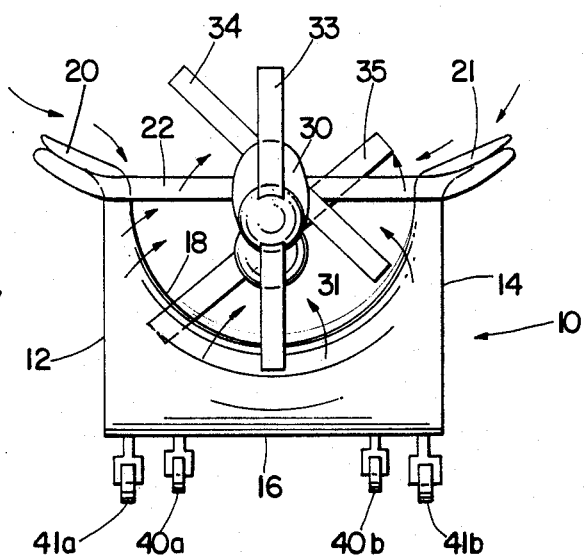
FIG. 1 is a front elevation of the aircraft according to the present invention.

As shown in FIG. 1, an aircraft according to the present invention has a fuselage 10 having a lower exterior surface 16, and exterior side walls 12 and 14, respectively.

Figure 2:
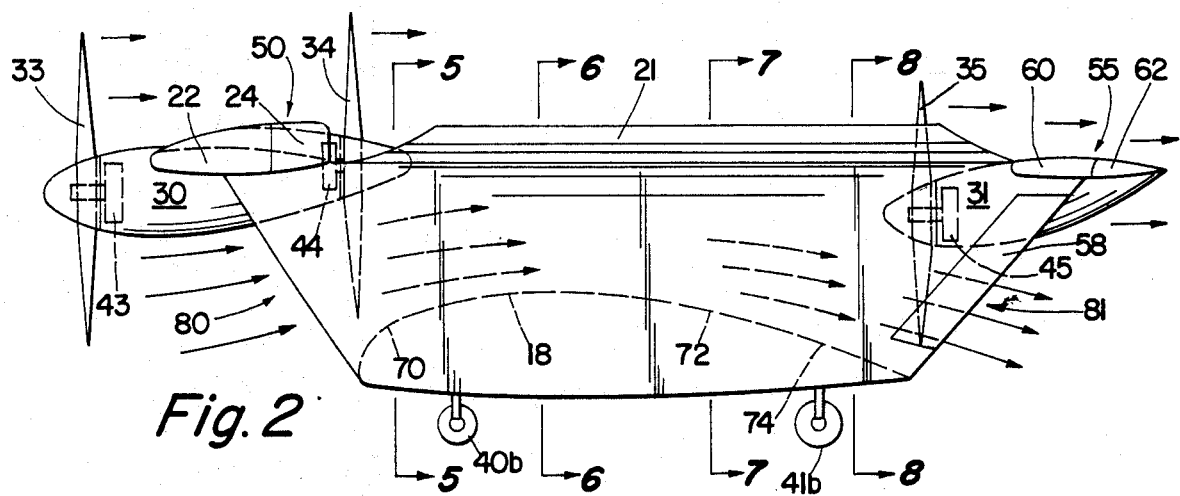
FIG. 2 is a side elevation of the aircraft of FIG. 1.
Figure 3:
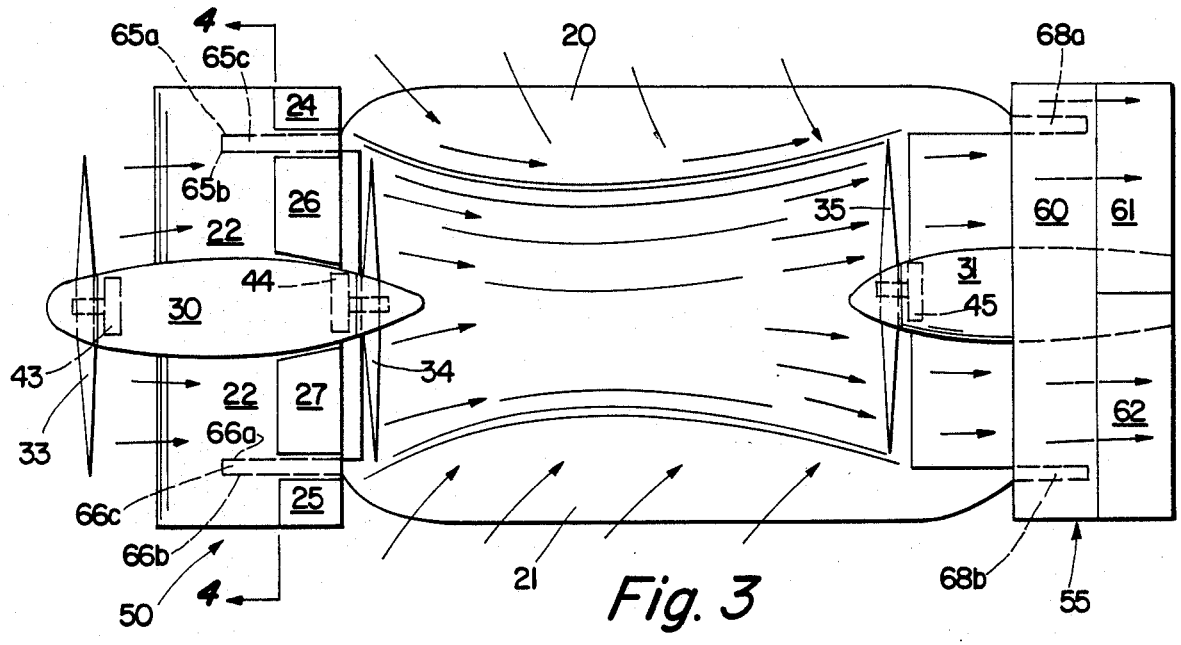
FIG. 3 is a top view of the aircraft of FIG. 1.

A front engine 30 provides drive for two front propellers, 33 and 34, respectively. A rear engine 31 provides drive for a rear propeller 35. As shown in FIGS. 1, 2 and 3, the front engine 30 is mounted on a canard 22 which in turn is connected to fuselage wall extension members 65c and 66c at the upper periphery of each side of a central channel through the fuselage at points 65a, 65b, 66a and 66b as further shown in FIG. 4. The front engine 30 contains separate means 43 and 44 for driving the two front propellers 33 and 34, respectively. The rear engine 31 is similarly mounted on a horizontal stabilizer 60 which in turn is connected to fuselage wall extension members 68a and 68b at the upper periphery of each side of a central channel through the fuselage as shown. The rear engine 31 contains a single means 45 for driving the rear propeller 35.

The canard 22 is part of a canard system 50 which also includes relatively conventional control surfaces, ailerons 24 and 25 and elevators 26 and 27 on its trailing edge. In a similar manner, the horizontal stabilizer 60 is part of a horizontal stabilizer system 55 which in the disclosed embodiment also includes conventional control surface members 61 and 62 on its trailing edge which function as elevrons (i.e. combination elevators and ailerons).

Landing gear consisting of front wheels and struts 40a and 40b and rear wheels and struts 41a and 41b underneath the fuselage are provided. These may be made retractable in a conventional manner by means not shown.

A channel having a semi-venturi cross section is formed lengthwise in the fuselage 10 as shown in FIGS. 1, 2, 3, 5, 6, 7 and 8. The interior cross-sectional opening of the channel varies from the front end 80 of the channel where the canard system 50 is located to the rear end 81 of the channel where the horizontal stabilizer system 55 is located. In flight operation of the aircraft according to the present invention air is accelerated by the propulsion system through the semi-venturi channel from the front end 80 to the rear end 81.

Figures 5, 6:
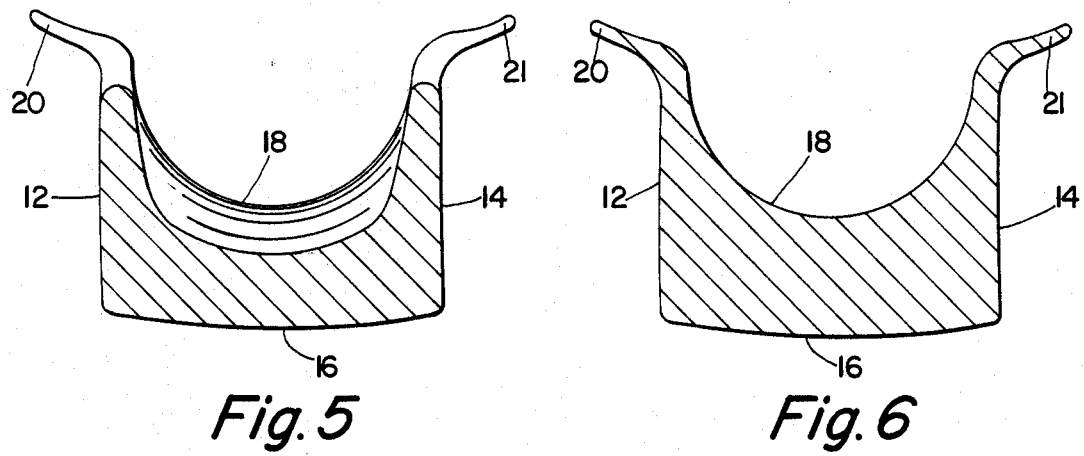
FIG. 5 is a cross-sectional view taken at the station 5—5 in FIG. 2.
FIG. 6 is a cross-sectional view taken at the station 6—6 in FIG. 2.
Figures 7, 8:
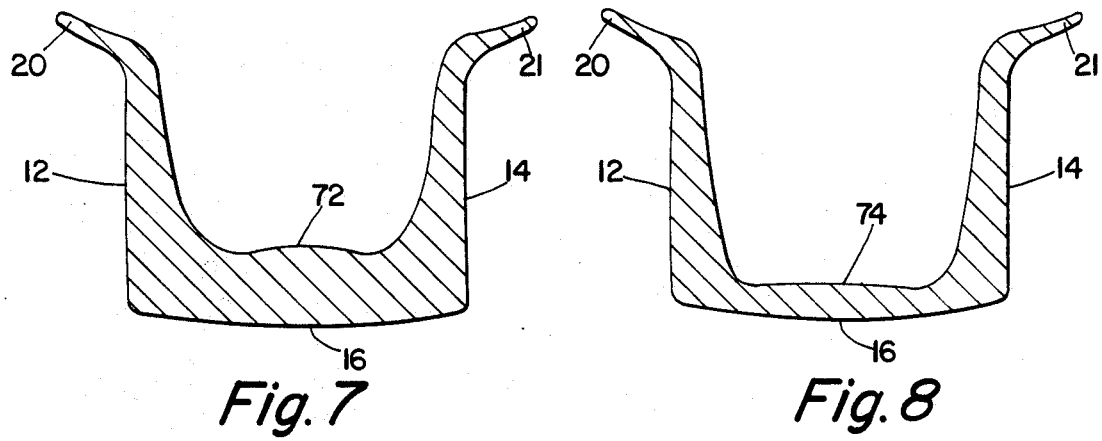
FIG. 7 is a cross-sectional view taken at the station 7—7 in FIG. 2.
FIG. 8 is a cross-sectional view taken at the station 8—8 in FIG. 2.

Line 18 as designated in FIGS. 1, 5 and 6 defines the interior cross section of the channel at its point of smallest cross-sectional opening area which corresponds to station 6—6 in FIG. 2. At that point the cross-sectional opening in the interior of the channel is approximately the shape of a semi-circle or half circle. The designation "semi-venturi" used by the inventor to describe the basic interior channel shape in the fuselage is based upon the similarity of that shape to the shape of a more conventional venturi tube which had been cut in half longitudinally.

The interior cross-sectional shape of the channel at station 5—5 in FIG. 2 is shown by line 70 in FIG. 5. In a like manner the interior cross-sectional shape of the channel at station 7—7 in FIG. 2 is shown by line 72 in FIG. 7. Similarly, the interior cross-sectional shape of the channel at station 8—8 in FIG. 2 is shown by line 74 in FIG. 8. The continuous sequence of these cross sections along the length of the channel from the front end 80 to the rear end 81 of the channel defines the semi-venturi airfoil surface which produces the primary lift during flight operations of the aircraft.

The dotted line in FIG. 2 bearing the numeral designations 70 at station 5—5, 18 at station 6—6, 72 at station 7—7 and 74 at station 8—8 defines a line along the center of the bottom of the channel between the front end 80 and the rear end 81 of the channel.

The upper periphery of each side wall of the channel is formed, respectively, into continuous surfaces 20, 21 extending upwardly and outwardly from the interior of the channel over a substantial length along the mid-section of the channel. The lineal dimensions in cross section of these continuous extension surfaces is less than the lineal dimension in cross section of the channel opening itself.

Figure 4:
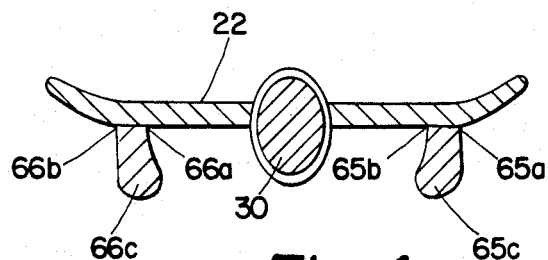
FIG. 4 is a cross-sectional view taken at the station 4—4 in FIG. 3.

The lateral ends of the canard 22 are similarly shaped as shown in FIGS. 1, 2 and 4.

A conventional rudder system such as illustrated by a rudder is 58 included in the walls defining the channel at the rear end of the channel. Only one such rudder 58 is shown in FIG. 2 due to limitations of the drawing, but preferably such rudders are utilized in pairs symmetrically in the opposite walls defining the sides of the channel.

Air flow lines are shown in FIGS. 1, 2 and 3 to assist in the explanation of the operation. While the preferred embodiment discloses three separate air accelerating devices (ie., propellers 33, 34 and 35), it is not necessary to use multiple propellers in the overall propulsion system or even propeller systems at all. An air mass flow jet engine may be used in lieu of a propeller system and only a single engine of any type is required for operation. Such a limited propulsion system may be arranged to either to blow or to suck air through the semi-venturi airfoil channel.

Air being blown or sucked through the channel will also interact with the canard system 50, the horizontal stabilizer system 55 and the rudder system of which the rudder 58 is a part. The canard system itself will generate lift and provide pitch and roll control. Similarly, the horizontal stabilizer system and the rudder systems provides pitch, roll and yaw control.

The primary lift generation for this aircraft, however, results from the flow of air over the semi-venturi airfoil surface in the channel which generates a low pressure area creating lift immediately above the semi-venturi airfoil surface and also on the channel wall extension surfaces 20 and 21.

As can be seen, it is possible to generate considerable lift using the air accelerating propulsion system even when there is minimal or no horizontal movement of the aircraft. Thus, VTOL and STOL operation is possible.

It is desirable but not essential to be able to control the axis of the air flow of the air accelerated by the propulsion system relative to a horizontal axis through the channel. A degree of this control can be achieved in the disclosed embodiment by controlling the relative settings of the three propellers which are on different axes.

This added complexity for finer control is not warranted in certain applications, however, and is not necessary. It is generally desirable to have the air flow direction aligned to be in a slightly upward direction relative to a horizontal axis through the channel.

With coordinated use of the ailerons, elevators and rudders, elevrons and engine controls, highly stable and maneuverable flight operations, including VTOL, STOL and hovering are possible. RPV operation is also feasible using well known RPV technologies.

The simple design and structure of this aircraft makes it amenable to simple and low cost construction techniques using composite and honeycomb materials.

Accordingly, it is seen that the aircraft according to the present invention accomplishes the above described objects as well as other objects which will be apparent to those skilled in the art who will also appreciate that various modifications and changes may be made to the present invention without departing from the scope of the invention as defined in the appended claims.

What is claimed is:

1. An aircraft comprising:
    a central semi-venturi shaped airfoil surface adapted to function as the primary lift generating surface for said aircraft; said airfoil surface defining a channel having a front end and a rear end and having a varying cross-sectional opening along its length; the cross-sectional opening at the point of smallest opening in the interior of said channel being of a generally semi-circular shape; the lower surface of said channel providing a substantially flat lifting surface;
    a canard system connected to each side of the upper periphery of said channel at the front end thereof and having no obstructions to the airflow forward of or above said canard system;
    a horizontal stabilizer system connected to each side of the upper periphery of said channel at the rear end thereof; and
    propulsion means located forward of said canard system and connected to said airfoil surface for accelerating the flow of air through said channel from the front end to the rear end thereof and across said canard system and said horizontal stabilizer system in a controlled manner for controlled flight of said aircraft.

2. An aircraft according to claim 1 wherein said canard system comprises a canard having a controllable elevator and a controllable aileron on its trailing edge and wherein said horizontal stabilizer system comprises a horizontal stabilizer having controllable airfoil surfaces associated with its trailing edge.

3. An aircraft according to claim 1 wherein controllable rudders are included in a portion of the walls defining said channel at the rear end of said channel.

4. An aircraft according to claim 2 wherein controllable rudders are included in a portion of the walls defining said channel at the rear end of said channel.

5. An aircraft according to claim 1 wherein said propulsion means comprises:
    a first propulsion means mounted on said canard system for accelerating air into the front end of said channel in a slightly upward direction relative to a horizontal axis through said channel; and
    a second propulsion means mounted on said horizontal stabilizer system for accelerating air out of said channel at the rear end thereof.

6. An aircraft according to claim 2 wherein said propulsion means comprises:
   a first propulsion means mounted on said canard system for accelerating air into the front end of said channel in a slightly upward direction relative to a horizontal axis through said channel; and
   a second propulsion means mounted on said horizontal stabilizer system for accelerating air out of said channel at the rear end thereof.

7. An aircraft according to claim 3 wherein said propulsion means comprises:
   a first propulsion means mounted on said canard system for accelerating air into the front end of said channel in a slightly upward direction relative to a horizontal axis through said channel; and
   a second propulsion means mounted on said horizontal stabilizer system for accelerating air out of said channel at the rear end thereof.

8. An aircraft according to claim 1 wherein said channel is formed as an integral part of the fuselage of said aircraft; and wherein the upper periphery of each wall defining a side of said channel is formed along a substantial length of the mid-section of said channel into a continuous surface which extends upwardly and outwardly from the interior of said channel.

9. An aircraft according to claim 2 wherein said channel is formed as an integral part of the fuselage of said aircraft; and wherein the upper periphery of each wall defining a side of said channel is formed along a substantial length of the mid-section of said channel into a continuous surface which extends upwardly and outwardly from the interior of said channel.

10. An aircraft according to claim 3 wherein said channel is formed as an integral part of the fuselage of said aircraft; and wherein the upper periphery of each wall defining a side of said channel is formed along a substantial length of the mid-section of said channel into a continuous surface which extends upwardly and outwardly from the interior of said channel.

11. An aircraft according to claim 4 wherein said channel is formed as an integral part of the fuselage of said aircraft; and wherein the upper periphery of each wall defining a side of said channel is formed along a substantial length of the mid-section of said channel into a continuous surface which extends upwardly and outwardly from the interior of said channel.

12. An aircraft according to claim 5 wherein said channel is formed as an integral part of the fuselage of said aircraft; and wherein the upper periphery of each wall defining a side of said channel is formed along a substantial length of the mid-section of said channel into a continuous surface which extends upwardly and outwardly from the interior of said channel.

13. An aircraft according to claim 6 wherein said channel is formed as an integral part of the fuselage of said aircraft; and wherein the upper periphery of each wall defining a side of said channel is formed along a substantial length of the mid-section of said channel into a continuous surface which extends upwardly and outwardly from the interior of said channel.

14. An aircraft according to claim 7 wherein said channel is formed as an integral part of the fuselage of said aircraft; and wherein the upper periphery of each wall defining a side of said channel is formed along a substantial length of the mid-section of said channel into a continuous surface which extends upwardly and outwardly from the interior of said channel.

* * * * *